US008925602B2

(12) United States Patent
Kageyama

(10) Patent No.: US 8,925,602 B2
(45) Date of Patent: Jan. 6, 2015

(54) PNEUMATIC TIRE

(75) Inventor: Naoki Kageyama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 163 days.

(21) Appl. No.: 13/613,284

(22) Filed: Sep. 13, 2012

(65) Prior Publication Data

US 2013/0087261 A1    Apr. 11, 2013

(30) Foreign Application Priority Data

Oct. 7, 2011    (JP) .................. 2011-223169

(51) Int. Cl.
| | |
|---|---|
| B60C 11/04 | (2006.01) |
| B60C 11/117 | (2006.01) |
| B60C 11/12 | (2006.01) |
| B60C 11/01 | (2006.01) |
| B60C 11/03 | (2006.01) |
| B60C 11/00 | (2006.01) |

(52) U.S. Cl.
CPC ......... *B60C 11/0304* (2013.04); *B60C 11/1218* (2013.04); *B60C 11/01* (2013.01); *Y10S 152/902* (2013.01); *Y10S 152/03* (2013.01)
USPC ................ 152/209.8; 152/209.9; 152/209.16; 152/209.18; 152/209.17; 152/209.27; 152/902; 152/DIG. 3

(58) Field of Classification Search
CPC   B60C 11/0304; B60C 11/0306; B60C 11/01; B60C 2011/013
USPC ................. 152/209.8, 209.9, 209.16, 209.18, 152/DIG. 3, 209.17
See application file for complete search history.

(56) References Cited

U.S. PATENT DOCUMENTS 2,303,164 A * 11/1942 Hawkinson .................... 152/153
3,055,410 A * 9/1962 Caulkins .................. 152/209.21
4,862,934 A * 9/1989 Yamazaki ................ 152/209.16

(Continued)

FOREIGN PATENT DOCUMENTS

EP        370699 A2 * 5/1990
EP    1 277 599 B1    5/2007

(Continued)

OTHER PUBLICATIONS

Summary: JP02182505A; Fujikawa, Yuji; No date.*

(Continued)

*Primary Examiner* — Justin Fischer
*Assistant Examiner* — Kendra Shin
(74) *Attorney, Agent, or Firm* — Birch, Stewart, Kolasch & Birch, LLP

(57) ABSTRACT

A pneumatic tire has an asymmetric tread pattern and an outboard tread edge and an inboard tread edge to be located outside and inside of a vehicle respectively. Inboard shoulder blocks have an axial width and outboard shoulder blocks have an axial width more than the axial width of the inboard shoulder blocks. The inboard and outboard shoulder blocks are each provided with a plurality of sipes. The sipes of each outboard shoulder block include a circumferential sipe as the axially outermost sipe. The circumferential sipe extends at an angle of not more than 10 degrees with respect to the tire circumferential direction. The outboard shoulder block has an axially outer sidewall of which surface is provided with a plurality of narrow buttress grooves extending radially inwardly from the outboard tread edge.

20 Claims, 4 Drawing Sheets

(56) References Cited

U.S. PATENT DOCUMENTS

| | | | |
|---|---|---|---|
| 4,915,150 A * | 4/1990 | Takusagawa et al. | 152/209.16 |
| 5,605,588 A * | 2/1997 | Hatakenaka et al. | 152/209.22 |
| 6,619,352 B2 | 9/2003 | Diensthuber et al. | |
| 6,907,910 B2 * | 6/2005 | Iwamura | 152/209.18 |
| 2007/0056664 A1 * | 3/2007 | Suzuki | 152/209.16 |
| 2008/0223495 A1 * | 9/2008 | Ikeda et al. | 152/209.16 |
| 2009/0277550 A1 * | 11/2009 | Ikeda | 152/209.18 |
| 2011/0041973 A1 * | 2/2011 | Numata | 152/209.18 |
| 2012/0261044 A1 * | 10/2012 | Numata | 152/209.8 |

FOREIGN PATENT DOCUMENTS

| | | | |
|---|---|---|---|
| JP | 02182505 A | * | 7/1990 |
| JP | 06239110 A | * | 8/1994 |
| JP | 2005104385 A | * | 4/2005 |
| JP | 3648179 B2 | | 5/2005 |

OTHER PUBLICATIONS

Summary: JP2005104385A; Ohashi, Toshiyuki; No date.*
Summary: JP06239110A; Shinomiya, Masami; No date.*

* cited by examiner

PNEUMATIC TIRE

BACKGROUND OF THE INVENTION

The present invention relates to a pneumatic tire, more particularly to a studless tire having an asymmetric tread pattern capable of improving cornering performance and behavior in critical cornering on snowy/icy roads.

Essentially, a studless tire is required to have improved running performance on snowy/icy roads as a winter tire. In recent years, such a studless tire is also required to have improved running performance on dry pavements because of expansion of opportunity for running on pavements cleared of snow, reduction in snowfall period caused by global warming and the like.

Heretofore, an arrangement of tread grooves and sipes, namely a tread pattern (usually a block pattern) has been elaborated.

By increasing the rigidity of tread blocks by decreasing the number of sipes and/or the depths of sipes, performance on dry pavements may be improved. But, performance on snowy/icy roads is deteriorated. This technique therefore, can not be used.

By disposing large-sized shoulder blocks in a tread shoulder zone especially in an outboard tread shoulder zone, cornering performance on snowy/icy roads and also on dry pavements can be improved. Further, by increasing the total circumferential component of edges of shoulder blocks (block edges and sipes' edges) and making the profile of tire shoulders square than round, the lateral grip during cornering can be improved. If these techniques are employed in a studless tire, the cornering performance on snowy/icy roads and dry pavements can be improved. But, during cornering on snowy/icy roads, when exceeds critical cornering speed, sudden side skid is very liable to occur, and if once side skid occurs, it is difficult to get road grip again in a short time. Thus, the critical behavior becomes unstable.

SUMMARY OF THE INVENTION

It is therefore, an object of the present invention to provide a pneumatic tire, in which the critical behavior in critical cornering on snowy/icy roads can be improved together with the cornering performance on snowy/icy roads and also dry pavements.

According to the present invention, a pneumatic tire comprises a tread portion provided with an asymmetric tread pattern and having an outboard tread edge and an inboard tread edge to be located outside and inside of a vehicle, respectively, the asymmetric tread pattern comprising:

circumferential grooves extending continuously in the tire circumferential direction and including an outboard shoulder circumferential groove and an inboard shoulder circumferential groove;

transverse grooves including outboard shoulder transverse grooves extending from the outboard shoulder circumferential groove to the outboard tread edge, and inboard shoulder transverse grooves extending from the inboard shoulder circumferential groove to the inboard tread edge;

a row of circumferentially arranged outboard shoulder blocks defined by the outboard shoulder circumferential groove, the outboard tread edge and the outboard shoulder transverse grooves; and a row of circumferentially arranged inboard shoulder blocks defined by the inboard shoulder circumferential groove, the inboard tread edge and the inboard shoulder transverse grooves, wherein the inboard shoulder blocks have an axial width and the outboard shoulder blocks have an axial width more than the axial width of the inboard shoulder blocks, the inboard shoulder blocks and the outboard shoulder blocks are each provided with a plurality of sipes, the sipes of each of the outboard shoulder blocks include a circumferential sipe as the axially outermost sipe, the circumferential sipe extending at an angle of not more than 10 degrees with respect to the tire circumferential direction, and each of the outboard shoulder blocks has an axially outer sidewall of which surface is provided with a plurality of narrow buttress grooves extending radially inwardly from the outboard tread edge.

Preferably, the circumferential sipe has a zigzag configuration at the tread surface. The zigzag pitch of the zigzag configuration is different from the arrangement pitch of the narrow buttress grooves. The circumferential sipe preferably extends in the normal direction to the tread surface. Except for the circumferential sipe, each sipe of the outboard shoulder block preferably has surfaces inclined with respect to the normal direction to the tread surface. Preferably, in a tire meridian section, a corner of each of the outboard shoulder blocks defining the outboard tread edge is rounded.

Here, the inboard tread edge refers to one of the two tread edges Te which is intended to be positioned towards the center of the vehicle body. The outboard tread edge refers to the other tread edge which is intended to be positioned away from the center of the vehicle body. According thereto, in this application, the terms "outboard" and "inboard" are used toward the outboard tread edge and inboard tread edge, respectively, to refer relative positions in the tire axial direction.

Further, the terms "axially inner", "axially inward" and the like are used toward the tire equator, and the terms "axially outer", "axially outward" and the like are used toward the tread edge in order to refer relative positions in the tire axial direction with respect to the tire equator.

In the pneumatic tire according to the present invention, since the axial width of the outboard shoulder blocks is more than that of the inboard shoulder blocks, the outboard shoulder blocks which receive a relatively large side force during cornering, are increased in the rigidity, and thereby cornering performance on snowy/icy roads and dry pavements can be improved.

Since the outboard shoulder blocks are increased in the circumferential component of their edges owing to the circumferential sipes, the cornering performance on snowy/icy roads can be further improved.

Since the narrow buttress grooves reduce the rigidity of the surface of the axially outer sidewall of the outboard shoulder block, it is possible to avoid or reduce the occurrence of sudden side skid in critical cornering. Even if side skid occurs, it is predictable and controllable to get road grip.

Thus, the pneumatic tire according to the present invention can be improved in the cornering performance and critical behavior in critical cornering on snowy/icy roads.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The term "groove width" means a width of the concerned groove measured perpendicularly to the longitudinal direction of the groove.

DESCRIPTION OF THE PREFERRED EMBODIMENTS

Embodiments of the present invention will now be described in detail in conjunction with the accompanying drawings.

The pneumatic tire according to the present invention comprises, as usual, a tread portion 2, a pair of axially spaced bead portions each with a bead core therein, a pair of sidewall portions extending between the tread edges and the bead portions, a carcass extending between the bead portions, and a tread reinforcing belt disposed radially outside the carcass in the tread portion.

The pneumatic tire as an embodiment of the present invention is designed as a studless tire for passenger cars.

Figure 1:
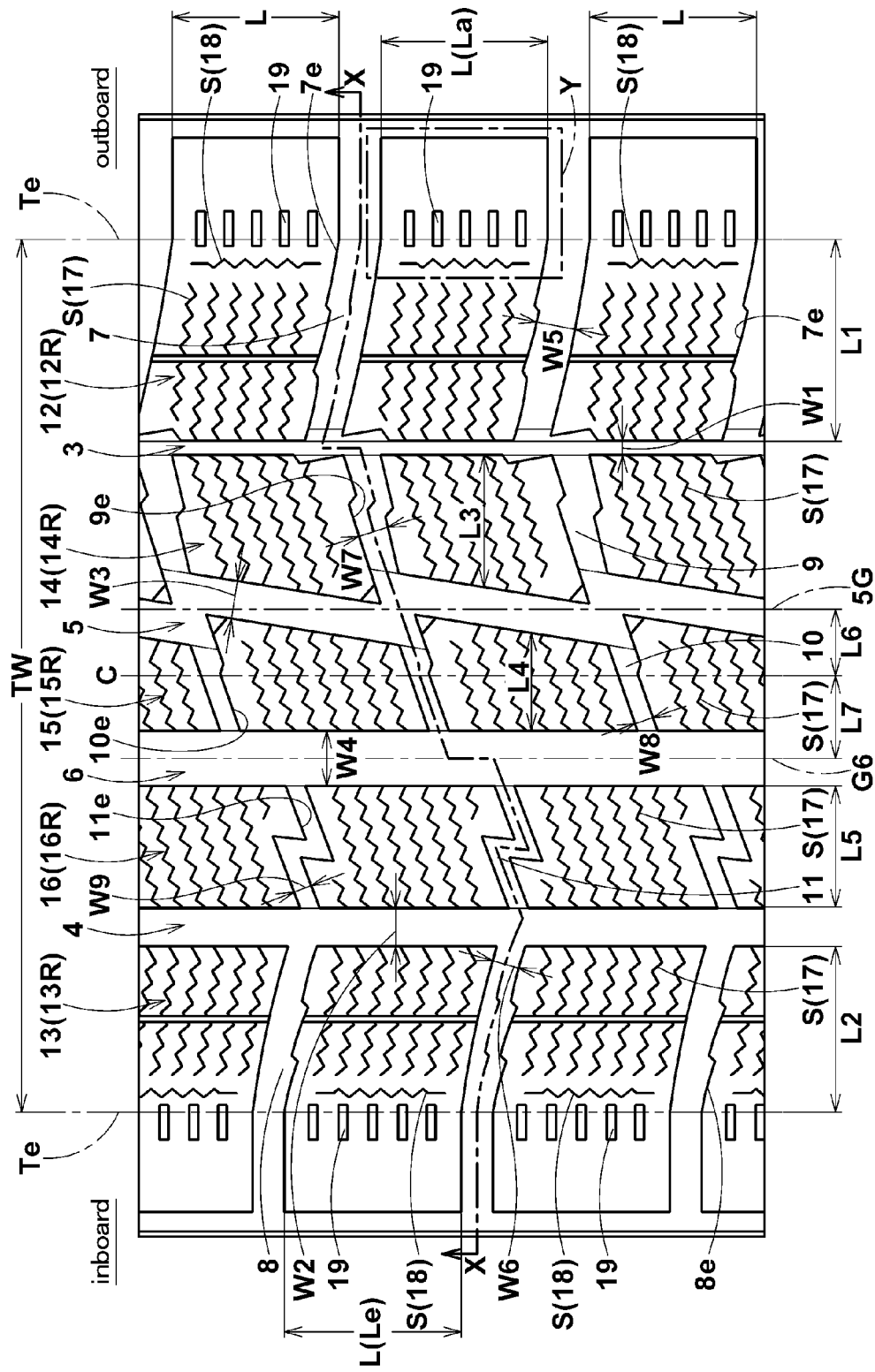
FIG. 1 is a developed partial plan view of a pneumatic tire as an embodiment of the present invention showing an asymmetric tread pattern.
Figure 2:
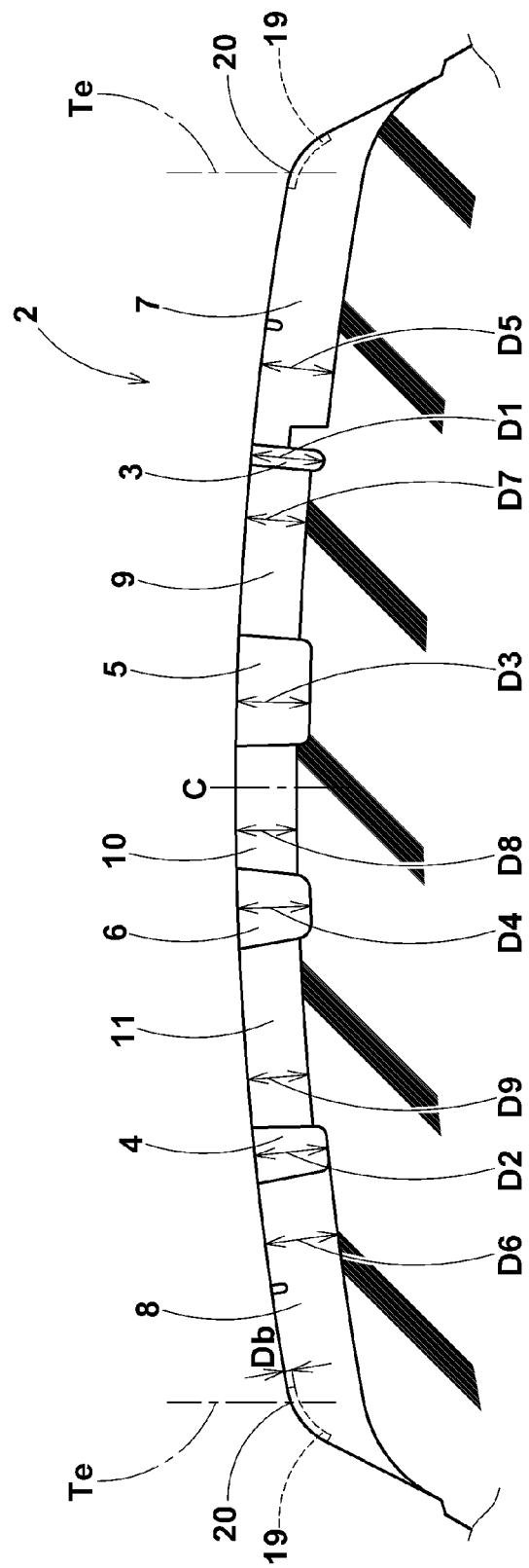
FIG. 2 is a cross sectional view of the tread portion thereof taken along line X-X of FIG. 1.

The tread portion 2 is provided with tread grooves defining a tread pattern as shown in FIG. 1. The tread pattern is asymmetric about the tire equator c. But, in this embodiment, the tire is nondirectional (or bidirectional). The sidewall portion to be located on outside is provided with an indication such as "outside", and the sidewall portion to be located on inside is provided with an indication such as "inside".

The tread grooves include circumferential grooves extending continuously in the tire circumferential direction, and transverse grooves intersecting with the circumferential grooves. In this application, a groove having a depth of more than 5 mm is called circumferential groove or transverse groove.

The circumferential grooves in this embodiment are: an outboard shoulder circumferential groove 3 as the most outboard circumferential groove; an inboard shoulder circumferential groove 4 as the most inboard circumferential groove; an outboard crown circumferential groove 5 between the outboard shoulder circumferential groove and the tire equator C; and an inboard crown circumferential groove 6 between the inboard shoulder circumferential groove 4 the tire equator C.

The transverse grooves in this embodiment are: a plurality of outboard shoulder transverse grooves 7 extending from the outboard shoulder circumferential groove 3 to the outboard tread edge Te; a plurality of inboard shoulder transverse grooves 8 extending from the inboard shoulder circumferential groove 4 to the inboard tread edge Te; a plurality of outboard middle transverse grooves 9 extending from the outboard shoulder circumferential groove 3 to the outboard crown circumferential groove 5; a plurality of inboard middle transverse grooves 11 extending from the inboard shoulder circumferential groove 4 to the inboard crown circumferential groove 6; and a plurality of center transverse grooves 10 extending between the outboard crown circumferential groove 5 and the inboard crown circumferential groove 6.

Therefore, the tread portion 2 in this embodiment has five block rows which are: a row 12R of circumferentially arranged outboard shoulder blocks 12 defined by the outboard shoulder circumferential groove 3, the outboard tread edge Te and the outboard shoulder transverse grooves 7; a row 13R of circumferentially arranged inboard shoulder blocks 13 defined by the inboard shoulder circumferential groove 4, inboard tread edge Te and the inboard shoulder transverse grooves 8; a row 14R of circumferentially arranged outside middle block 14 defined by the outboard shoulder circumferential groove 3, the outboard crown circumferential groove 5 and the outboard middle transverse grooves 9; a row 15R of circumferentially arranged center blocks 15 defined by the outboard crown circumferential groove 5, inboard crown circumferential groove 6 and the center transverse grooves 10; and a row 16R of circumferentially arranged inside middle blocks 16 defined by the inboard shoulder circumferential groove 4, the inboard crown circumferential groove 6 and the inboard middle transverse grooves 11.

The outboard shoulder circumferential groove 3, the inboard shoulder circumferential groove 4 and the inboard crown circumferential groove 6 are each formed as a straight groove to enhance the drainage as well as the self-ejecting of snow packed into the grooves. The outboard crown circumferential groove 5 is on the other hand, formed as a zigzag groove to increase grip during running on snowy/icy roads.

In order to effectively derive these functions, the groove widths w1, w2, w3 and w4 of the circumferential grooves 3, 4, 5 and 6, respectively, are preferably set in a range of not less than 1.2%, more preferably not less than 1.5%, but not more than 6.7%, more preferably not more than 6.5% of the tread width TW. And the groove depths D1, D2, D3 and D4 of the circumferential grooves 3, 4, 5 and 6, respectively, are preferably set in a range of not less than 6.5 mm, more preferably not less than 7.5 mm, but not more than 13.0 mm, more preferably not more than 12.5 mm. In this embodiment, the groove depths D1-D4 are the substantially same value.

The transverse grooves 7, 8, 9, 10 and 11 are inclined with respect to the tire axial direction in multi-directions in order that their groove edges 7e-11e improve the cornering performance on snowy/icy roads.

In order to further improve the cornering performance on snowy/icy roads, each of the transverse grooves 7, 8, 9, 10 and 11 has groove edges at least one of which is zigzag.

In order to effectively derive the above functions, the groove widths W5, W6, W7, W8 and W9 of the transverse grooves 7, 8, 9, 10 and 11 are preferably set in a range of not less than 6.5 mm, more preferably not less than 7.5 mm, but not more than 13.0 mm, more preferably not more than 12.5 mm. And the groove depths D5, D6, D7, D8 and D9 of the transverse grooves 7, 8, 9, 10 and 11 are preferably set in a range of not less than 6.5 mm, more preferably not less than 7.5 mm, but not more than 13.0 mm, more preferably not more than 12.5 mm.

In this embodiment, the groove depths D5 and D6 of the outboard shoulder transverse grooves 7 and the inboard shoulder transverse grooves 8 are the same value. The groove depths D7, D8 and D9 of the outboard middle transverse grooves 9, the center transverse grooves 10 and the inboard middle transverse grooves 11 are the same value less than the groove depths D5 and D6.

The outboard shoulder blocks 12 have an axial width (hereinafter "block width L1") and the inboard shoulder blocks 13 have an axial width (hereinafter "block width L2"), and the block width L1 is more than the block width L2.

Preferably, the ratio L1/L2 of the block widths L1 and L2 is set in a range of not less than 1.05, more preferably not less than 1.10, but not more than 1.40, more preferably not more than 1.35. Therefore, the rigidity of the outboard shoulder blocks 12 as a whole which are subjected to a large load during cornering is increased, and the cornering performance on dry pavements and snowy/icy roads can be improved.

In order to effectively derive such functions, the block width L1 is preferably more than axial block widths L3, L4 and L5 of the outside middle blocks 14, center blocks 15 and inside middle block 16, respectively, (each averaged across the entire circumference of the tire).

Further, the axial distance L6 from the tire equator C to the center line 5G (amplitude center line of zigzag) of the outboard crown circumferential groove 5 is preferably set in a range of not less than 5%, more preferably not less than 6%, but not more than 10%, more preferably not more than 9% of the tread width TW. And the axial distance L7 from the tire equator C to the groove center line 6G of the inboard crown circumferential groove 6 is preferably set in a range of not less than 7%, more preferably not less than 8%, but preferably not more than 12%, more preferably not more than 11% of the tread width TW.

In the tread portion 2 in this embodiment, a variable pitching method to disperse the pitch noise into a wide frequency range is employed in the circumferential lengths L of the outboard shoulder blocks 12 measured at the tread edge Te. More specifically, the circumferential lengths L include at least a middle circumferential length La constituting a middle pitch length, a shorter circumferential length constituting a shorter pitch length and a longer circumferential length constituting a longer pitch length which are circumferentially arranged in a nonperiodical sequence.

It is preferable that the block width L1 of the outboard shoulder block 12 having the middle circumferential length La is set in a range of not less than 101%, more preferably not less than 115%, but not more than 165%, more preferably not more than 150% of the length La. (L1/La is 1.01 to 1.65)

If L1/La is more than 1.65, then the circumferential rigidity of the outboard shoulder blocks 12 becomes insufficient, and there is a possibility that the straight running stability and braking performance are deteriorated. If L1/La is less than 1.01, then the axial rigidity becomes insufficient, and there is a possibility that the cornering performance and critical behavior when cornering are deteriorated.

In this embodiment, the variable pitching method is also employed in the inboard shoulder blocks 13, and the above description is also applied to the inboard shoulder blocks 13.

The above-mentioned blocks 12-16 are each provided with a plurality of sipes S as a characteristic of a studless tire.

The sipes S provided on the blocks 12-16 in this embodiment include transverse sipes 17 extending zigzag along the circumferentially adjacent transverse grooves 7, 8, 9, 10 and 11 to further increase edges extending in multi-directions.

Figure 4:
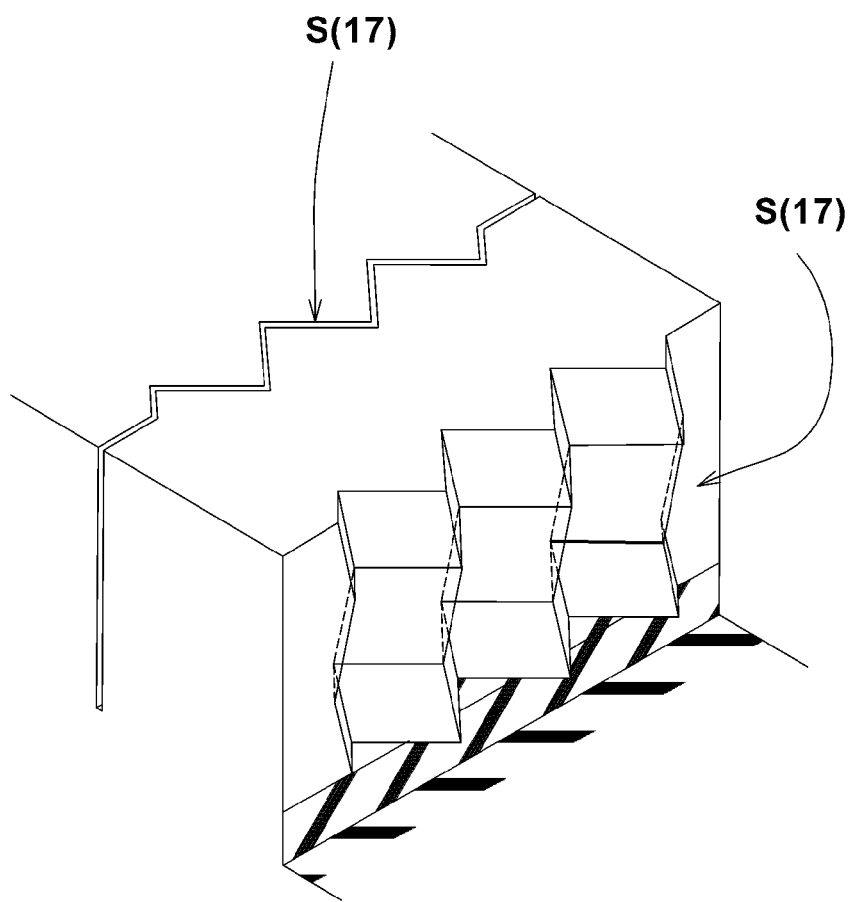
FIG. 4 is a perspective view showing a zigzag sipe having a plurality of inclined surfaces.

It is desirable that the opposite walls of the transverse sipe 17 has multiple surfaces inclined with respect to a normal direction to the tread surface as disclosed in U.S. Pat. No. 6,907,910 or European Patent No. 127759961 or Japanese Patent No. 3648179. Specifically, as shown in FIG. 4, in a range from the open top to a certain depth of the sipe, a configuration of the sipe in a plane parallel with the tread surface comprising a zigzag part, and the zigzag part oscillates in the longitudinal direction of the sipe in the course from the open top to the above-mentioned certain depth, at least one cycle for example 1.5 or 2.0 cycles.

In such sipe, therefore, the oppositely opposed surfaces can engage with each other, and the block's parts on both side of the sipe unite with each other to increase the apparent block rigidity. As a result, the cornering performance on snowy/icy roads and dry pavements can be improved.

Figure 3A:
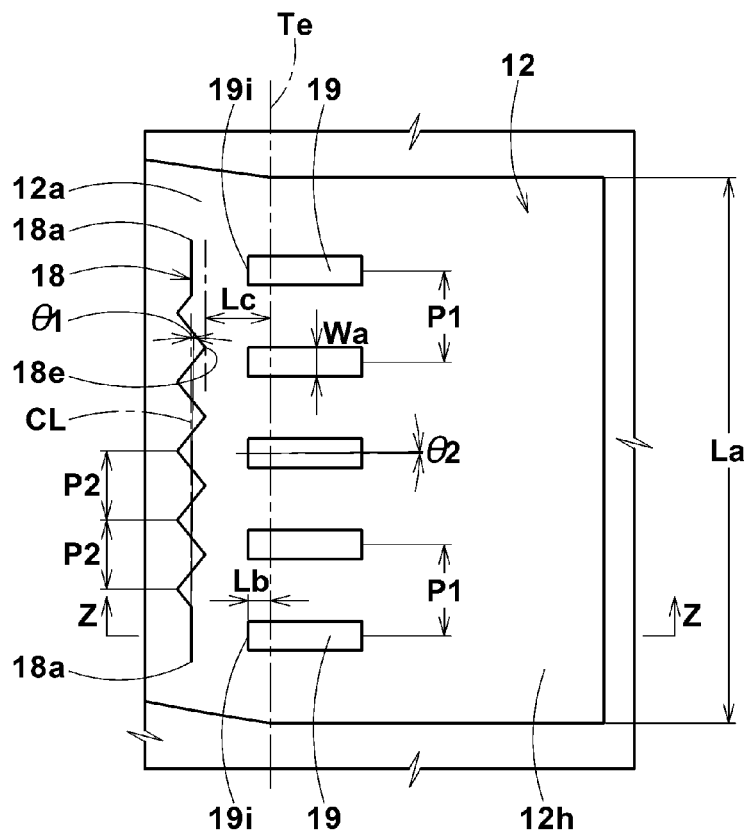
FIG. 3(a) is a closeup of part Y of FIG. 1.

As shown in FIG. 3(a), the sipes S of the outboard shoulder block 12 include a circumferential sipe 18 in addition to the above-mentioned transverse sipes 17.

The circumferential sipe 18 extends at an angle $\theta 1$ of not more than 10 degrees, preferably not more than 5 degrees, more preferably not more than 3 degrees, most preferably 0 degree with respect to the tire circumferential direction. The circumferential sipe 18 is formed as the most outboard sipe in the outboard shoulder block 12. Therefore, the cornering performance on icy roads can be improved by the edges of the circumferential sipes 18.

In this embodiment, the circumferential sipe 18 is a zigzag sipe. In the case of the zigzag circumferential sipe 18, the above-mentioned angle $\theta 1$ is that of the amplitude center line CL of zigzag of the circumferential sipe.

The circumferential sipe 18 may be formed as a sipe having the multiple inclined surfaces as explained in relation to the transverse sipe 17. In this embodiment, however, as shown in FIG. 3(b), the circumferential sipe 18 extends in a normal direction to the tread surface to reduce the rigidity of the outboard shoulder blocks 12 near the tread edge Te and thereby to improve critical behavior in critical cornering.

In order to effectively derive such functions, the depth Da of the circumferential sipe 18 is preferably set in a range of not less than 50%, more preferably not less than 60%, but not more than 100% of the groove depth D5 of the outboard shoulder transverse grooves 7.

However, in order not to excessively decrease the rigidity of the outboard shoulder block 12, and not to deteriorate the cornering performance on dry pavements, both of the circumferential ends 18a of the circumferential sipe 18 are preferably closed within the outboard shoulder block 12.

Figure 3B:
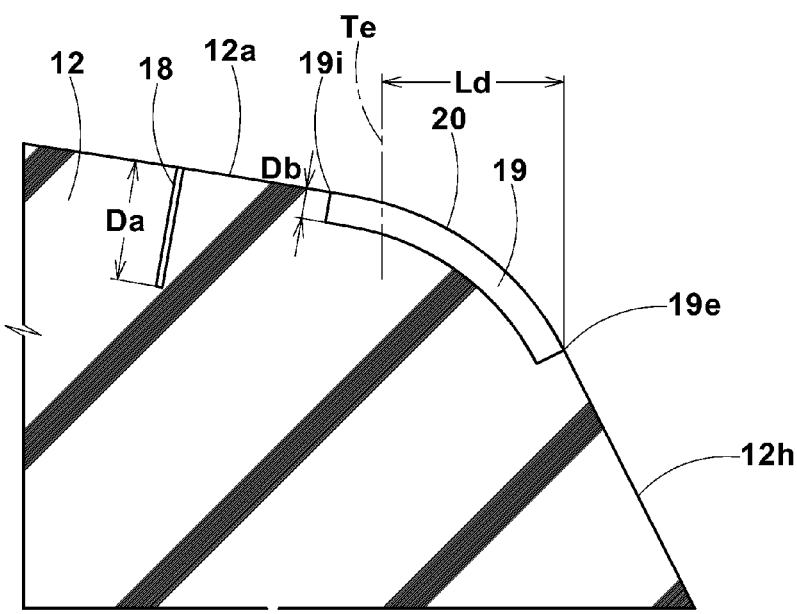
FIG. 3(b) is a cross sectional view taken along line Z-Z of FIG. 3(a).

As shown in FIGS. 3(a) and 3(b), the outboard shoulder blocks 12 each have an axially outer sidewall 12h provided with a plurality of narrow buttress grooves 19.

The narrow buttress grooves 19 extend radially inwardly from the outboard tread edge Te and are arranged in the tire circumferential direction. Therefore, the rigidity of the surface of the axially outer sidewall 12h near the outboard tread edge Te is reduced, and thereby the occurrence of sudden side skid in critical cornering can be avoided or reduced. Even if side skid occurs, it is predictable and controllable to get road grip.

In the developed plan view as shown in FIG. 1 and FIG. 3(a), the narrow buttress groove 19 in this embodiment has a substantially rectangular shape extending at an angle θ2 in a range of from 0 to 5 degrees with respect to the axial direction. Therefore, the area provided with the narrow buttress groove 19 is decreased in the axial rigidity, which helps to further reduce the occurrence of sudden side skid.

In order to effectively derive this function, in each of the outboard shoulder blocks 12, the total circumferential width Wn of the narrow buttress grooves 19 is preferably set in a range of not less than 19%, more preferably not less than 21%, but not more than 33%, more preferably not more than 31% of the circumferential length La of the outboard shoulder block 12 measured along the axially outer sidewall 12h.

If all of the narrow buttress grooves have the same width Wa and the number of the narrow buttress grooves is "n" (in this example, n=5), then the total circumferential width Wn is Wa×n.

The depth Db of the narrow buttress grooves 19 is preferably set in a range of not less than 0.3 mm, more preferably not less than 0.5 mm, but not more than 2.5 mm, more preferably not more than 2.0 mm.

The axial distance Lb measured axially inwardly from the tread edge Te to the axially inner end 19i of the narrow buttress groove 19 is preferably set in a range of not less than 20%, more preferably not less than 25%, but not more than 50%, more preferably not more than 45% of the axial distance Lc measured axially inwardly from the tread edge Te to the axially outermost point 18e of the circumferential sipe 18.

The axial distance Ld measured axially outwardly from the tread edge Te to the axially outer end 19e of the narrow buttress groove 19 is preferably set in a range of not less than 8%, more preferably not less than 10%, but not more than 22%, more preferably not more than 20% of the block width L1.

It is preferable that the arrangement pitch P1 of the narrow buttress grooves 19 is different from the zigzag pitch P2 of the circumferential sipes 18. In this embodiment, the ratio P1/P2 of the arrangement pitch P1 to the zigzag pitch P2 is set in a range of from 1.2 to 1.4. As a result, in a part between the circumferential sipe 18 and the tread edge Te, the rigidity variation in the circumferential direction is decreased to prevent the durability from decreasing.

In order to further improve the critical behavior when cornering, as shown in FIG. 3(b), in a tire meridian section, the axially outer corner 20 of the outboard shoulder block 12 is rounded to smoothly connect between the sidewall face 12h and the ground contacting top surface 12a of the outboard shoulder block 12. Preferably, the radius R of curvature of the rounded corner 20 is not less than 1.0 mm, more preferably not less than 2.0 mm, but not more than 10 mm, more preferably not more than 6 mm. Incidentally, the outboard tread edge Te is positioned on the rounded corner 20.

The above-explained advantageous effects of the outboard shoulder blocks 12 during cornering can be obtained when the tire is positioned on the outside of the cornering. In order to obtain similar effects even when the tire is positioned on the inside of the cornering, each of the inboard shoulder blocks 13 is provided with the circumferential sipe 18, the narrow buttress grooves 19 and the rounded corner 20 as described above. Namely, the above descriptions can be applied here by replacing "outboard shoulder block" with "inboard shoulder block".

In the tread pattern in this embodiment, as shown in FIG. 1, the outboard crown circumferential groove 5 is made up of alternate long groove segments and short groove segments, and the short groove segments intersect with the long groove segments at an acute angle to have a lightning shape.

The outboard shoulder transverse grooves 7 and inboard shoulder transverse grooves 8 each have a zigzag edge and a nonzigzag (slightly curved or substantially linear) edge. The zigzag edges of the outboard shoulder transverse grooves 7 are formed on one side in the tire circumferential direction, whereas the zigzag edges of the inboard shoulder transverse grooves 8 are formed on the other side in the tire circumferential direction. The zigzag edge is made up of alternate long segments and short segments.

With respect to the axial direction, the outboard shoulder transverse grooves 7 and inboard shoulder transverse grooves 8 are inclined to the same direction.

Both edges of the inboard middle transverse groove 11 are zigzag, and the inboard middle transverse groove 11 is made up of two long groove segments and a short groove segment therebetween, wherein the short groove segment is almost parallel to the circumferential direction, and with respect to the axial direction, the long groove segments are inclined to the opposite direction to the outboard shoulder transverse grooves 7 and inboard shoulder transverse grooves 8.

With respect to the axial direction, the outboard middle transverse grooves 9 and the center transverse grooves 10 are inclined to the opposite direction to the outboard shoulder transverse grooves 7 and inboard shoulder transverse grooves 8. As shown in FIG. 1, one of the outboard middle transverse grooves 9, one of the center transverse grooves 10 and one of the above-mentioned short groove segments of the outboard crown circumferential groove 5 are arranged in line.

Both edges of the outboard middle transverse groove 9 are zigzag. The center transverse groove 10 has a zigzag edge and a nonzigzag (linear) edge.

The groove width W1 of the circumferential groove 3 is smallest. The groove width W4 of the circumferential groove 6 is largest. The groove width W2 of the circumferential groove 4 and the groove width W3 of the circumferential groove 5 are the substantially same and between the groove width W1 and groove width W4.

The axially inner ends of the outboard shoulder transverse grooves 7 are shifted in one circumferential direction from the axially outer ends of the outboard middle transverse grooves 9 so that the openings of the grooves on both sides of the narrowest circumferential groove 3 are substantially not overlapped with each other in the circumferential direction.

Comparison Tests

Pneumatic tires of size 195/65R15 (rim size 15×6.0 J) for passenger car were prepared and tested for the cornering performance and critical behavior in critical cornering on snowy/icy roads.

The tires had tread patterns based on the tread pattern shown in FIG. 1. The specifications thereof are shown in Table 1.

Common specifications are as follows.
   tread width TW: 162 mm
   distance L6: 8.0% of TW
   distance L7: 9.3% of TW block width ratio L1/L2: 1.2
circumferential sipe depth Da: 5.0 mm
block width L2/circumferential length Lc of inboard shoulder block constituting middle pitch length: 100%

In the test, the test tires (tire pressure 200 kPa) were mounted on all wheels of a 2000 cc passenger car and run at a speed of 40 km/h on a snowy road and icy road in a tire test course and also on a dry pavement in a tire test course, and the test driver evaluated cornering performance based on the steering response, rigid feeling, grip and the like when cornering. Further, on the snowy and icy roads, the behavior of the tire in critical cornering was evaluated by the test driver. The test results are indicated by an index based on comparative tire Ref. 1 being 6, wherein the larger the index, the better the cornering performance.

From the test results, it was confirmed that, according to the present invention, the critical behavior on snowy/icy roads and the cornering performance can be effectively improved. In addition, the same results could be obtained from similar tests made by changing the widths and depths of the grooves 3-11 and 19 and the block width ratio L1/L2.

TABLE 1

| Tire | Ref. 1 | Ex. 1 | Ex. 2 | Ex. 3 | Ex. 4 | Ex. 5 | Ex. 6 | Ex. 7 |
|---|---|---|---|---|---|---|---|---|
| width L1/length La (%) | 126 | 126 | 95 | 107 | 160 | 180 | 126 | 126 |
| distance ratio Lb/Lc (%) | — | 40 | 40 | 40 | 40 | 40 | 20 | 25 |
| buttress groove depth Db (mm) | — | 0.6 | 0.6 | 0.6 | 0.6 | 0.6 | 0.6 | 0.6 |
| distance Ld/width L1 (%) | — | 15.0 | 15.0 | 15.0 | 15.0 | 15.0 | 15.0 | 15.0 |
| shoulder block corner radius R (mm) | 0 | 3.0 | 3.0 | 3.0 | 3.0 | 3.0 | 3.0 | 3.0 |
| cornering performance on dry pavement | 6.0 | 6.6 | 6.1 | 6.6 | 6.5 | 5.9 | 6.6 | 6.5 |
| cornering performance on snowy road | 6.0 | 6.6 | 6.4 | 6.5 | 6.5 | 5.9 | 6.1 | 6.5 |
| cornering performance on icy road | 6.0 | 6.6 | 6.4 | 6.5 | 6.5 | 6.5 | 6.5 | 6.5 |
| critical behavior on snowy road | 6.0 | 6.6 | 6.1 | 6.4 | 6.5 | 6.0 | 6.5 | 6.6 |
| critical behavior on icy road | 6.0 | 6.6 | 5.9 | 6.4 | 6.5 | 6.5 | 6.1 | 6.6 |

| Tire | Ex. 8 | Ex. 9 | Ex. 10 | Ex. 11 | Ex. 12 | Ex. 13 | Ex. 14 | Ex. 15 |
|---|---|---|---|---|---|---|---|---|
| width L1/length La (%) | 126 | 126 | 126 | 126 | 126 | 126 | 126 | 126 |
| distance ratio Lb/Lc (%) | 45 | 50 | 40 | 40 | 40 | 40 | 40 | 40 |
| buttress groove depth Db (mm) | 0.6 | 0.6 | 0.1 | 0.3 | 2.5 | 3.0 | 0.6 | 0.6 |
| distance Ld/width L1 (%) | 15.0 | 15.0 | 15.0 | 15.0 | 15.0 | 15.0 | 8.0 | 10.0 |
| shoulder block corner radius R (mm) | 3.0 | 3.0 | 3.0 | 3.0 | 3.0 | 3.0 | 3.0 | 3.0 |
| cornering performance on dry pavement | 6.5 | 6.0 | 6.6 | 6.6 | 6.6 | 6.1 | 6.6 | 6.6 |
| cornering performance on snowy road | 6.5 | 6.5 | 6.5 | 6.5 | 6.5 | 6.5 | 6.6 | 6.6 |
| cornering performance on icy road | 6.5 | 6.5 | 6.5 | 6.5 | 6.5 | 6.1 | 6.5 | 6.5 |
| critical behavior on snowy road | 6.6 | 6.1 | 6.1 | 6.6 | 6.6 | 6.5 | 6.0 | 6.6 |
| critical behavior on icy road | 6.6 | 6.5 | 6.1 | 6.6 | 6.6 | 6.8 | 6.0 | 6.6 |

| Tire | Ex. 16 | Ex. 17 | Ex. 18 | Ex. 19 | Ex. 20 | Ex. 21 |
|---|---|---|---|---|---|---|
| width L1/length La (%) | 126 | 126 | 126 | 126 | 126 | 126 |
| distance ratio Lb/Lc (%) | 40 | 40 | 40 | 40 | 40 | 40 |
| buttress groove depth Db (mm) | 0.6 | 0.6 | 0.6 | 0.6 | 0.6 | 0.6 |
| distance Ld/width L1 (%) | 20.0 | 22.0 | 15.0 | 15.0 | 15.0 | 15.0 |
| shoulder block corner radius R (mm) | 3.0 | 3.0 | 0.5 | 1.0 | 6.0 | 10.0 |
| cornering performance on dry pavement | 6.6 | 6.0 | 6.6 | 6.6 | 6.6 | 6.1 |
| cornering performance on snowy road | 6.6 | 6.0 | 6.5 | 6.5 | 6.5 | 6.1 |
| cornering performance on icy road | 6.5 | 6.5 | 6.6 | 6.6 | 6.6 | 6.6 |
| critical behavior on snowy road | 6.6 | 6.6 | 6.0 | 6.6 | 6.6 | 6.6 |
| critical behavior on icy road | 6.6 | 6.6 | 6.0 | 6.6 | 6.6 | 6.6 |

The invention claimed is:

1. A pneumatic tire comprising
a tread portion provided with an asymmetric tread pattern and having an outboard tread edge and an inboard tread edge to be located outside and inside of a vehicle respectively,
the asymmetric tread pattern comprising: circumferential grooves extending continuously in the tire circumferential direction and including an outboard shoulder circumferential groove, an outboard crown circumferential groove, an inboard crown circumferential groove and an inboard shoulder circumferential groove; transverse grooves including outboard shoulder transverse grooves extending from the outboard shoulder circumferential groove to the outboard tread edge, and inboard shoulder transverse grooves extending from the inboard shoulder circumferential groove to the inboard tread edge; a row of circumferentially arranged outboard shoulder blocks defined by the outboard shoulder circumferential groove, the outboard tread edge and the outboard shoulder transverse grooves; and a row of circumferentially arranged inboard shoulder blocks defined by the inboard shoulder circumferential groove, the inboard tread edge and the inboard shoulder transverse grooves,
wherein the inboard shoulder blocks have an axial width and the outboard shoulder blocks have an axial width more than the axial width of the inboard shoulder blocks,
wherein the inboard shoulder blocks and the outboard shoulder blocks are each provided with a plurality of sipes,
wherein the sipes of each said outboard shoulder block include a circumferential sipe as the axially outermost sipe, the circumferential sipe extending at an angle of not more than 10 degrees with respect to the tire circumferential direction,
wherein each said outboard shoulder block has an axially outer sidewall of which surface is provided with a plurality of narrow buttress grooves extending radially inwardly from the outboard tread edge to have an axially inner end and an axially outer end,
wherein, in each said outboard shoulder block, the total circumferential width of the narrow buttress grooves is not less than 19% but not more than 33% of the circumferential length of the outboard shoulder block measured along the axially outer sidewall, wherein the outboard shoulder circumferential groove is a straight groove, wherein the outboard crown circumferential groove is a zigzag groove, wherein the inboard crown circumferential groove is a straight groove wider than the inboard shoulder circumferential groove, and wherein the inboard shoulder circumferential groove is a straight groove wider than the outboard shoulder circumferential groove.

2. The pneumatic tire according to claim 1, wherein said circumferential sipe has a zigzag configuration at the tread surface.

3. The pneumatic tire according to claim 2, wherein in each said outboard shoulder block, the zigzag pitch of the zigzag configuration of the circumferential sipe is different from the arrangement pitch of the narrow buttress grooves.

4. The pneumatic tire according to claim 3, wherein said circumferential sipe extends in the normal direction to the tread surface.

5. The pneumatic tire according to claim 3, wherein opposite walls of each said sipe of the outboard shoulder block except for the circumferential sipe have multiple opposite surfaces inclined with respect to the normal direction to the tread surface.

6. The pneumatic tire according to claim 3, wherein in a tire meridian section, a corner of each said outboard shoulder block defining the outboard tread edge is rounded.

7. The pneumatic tire according to claim 3, wherein in a tire meridian section, a corner of each said outboard shoulder block defining the outboard tread edge is rounded by a radius of curvature in a range of not less than 1.0 mm and not more than 10 mm.

8. The pneumatic tire according to claim 2, wherein said circumferential sipe extends in the normal direction to the tread surface.

9. The pneumatic tire according to claim 2, wherein opposite walls of each said sipe of the outboard shoulder block except for the circumferential sipe have multiple opposite surfaces inclined with respect to the normal direction to the tread surface.

10. The pneumatic tire according to claim 2, wherein in a tire meridian section, a corner of each said outboard shoulder block defining the outboard tread edge is rounded.

11. The pneumatic tire according to claim 2, wherein in a tire meridian section, a corner of each said outboard shoulder block defining the outboard tread edge is rounded by a radius of curvature in a range of not less than 1.0 mm and not more than 10 mm.

12. The pneumatic tire according to claim 1, wherein said circumferential sipe extends in the normal direction to the tread surface.

13. The pneumatic tire according to claim 12, wherein opposite walls of each said sipe of the outboard shoulder block except for the circumferential sipe have multiple opposite surfaces inclined with respect to the normal direction to the tread surface.

14. The pneumatic tire according to claim 12, wherein in a tire meridian section, a corner of each said outboard shoulder block defining the outboard tread edge is rounded.

15. The pneumatic tire according to claim 12, wherein in a tire meridian section, a corner of each said outboard shoulder block defining the outboard tread edge is rounded by a radius of curvature in a range of not less than 1.0 mm and not more than 10 mm.

16. The pneumatic tire according to claim 1, wherein opposite walls of each said sipe of the outboard shoulder block except for the circumferential sipe have multiple opposite surfaces inclined with respect to the normal direction to the tread surface.

17. The pneumatic tire according to claim 16, wherein in a tire meridian section, a corner of each said outboard shoulder block defining the outboard tread edge is rounded.

18. The pneumatic tire according to claim 16, wherein in a tire meridian section, a corner of each said outboard shoulder block defining the outboard tread edge is rounded by a radius of curvature in a range of not less than 1.0 mm and not more than 10 mm.

19. The pneumatic tire according to claim 1, wherein in a tire meridian section, a corner of each said outboard shoulder block defining the outboard tread edge is rounded, wherein, in each said outboard shoulder block, the axial distance measured axially inwardly from the tread edge to the axially inner end of each said narrow buttress groove is not less than 20% but not more than 50% of the axial distance measured axially inwardly from the tread edge to the axially outermost point of the circumferential sipe, and wherein the axial distance measured axially outwardly from the tread edge to the axially outer end of each said narrow buttress groove is not less than 8% but not more than 22% of the axial width of the outboard shoulder block.

20. The pneumatic tire according to claim 1, wherein in a tire meridian section, a corner of each said outboard shoulder block defining the outboard tread edge is rounded by a radius of curvature in a range of not less than 1.0 mm and not more than 10 mm.

* * * * *